July 23, 1957     A. A. OBERMAIER     2,800,023
RADIATION PYROMETERS
Filed March 24, 1954                                           2 Sheets-Sheet 1
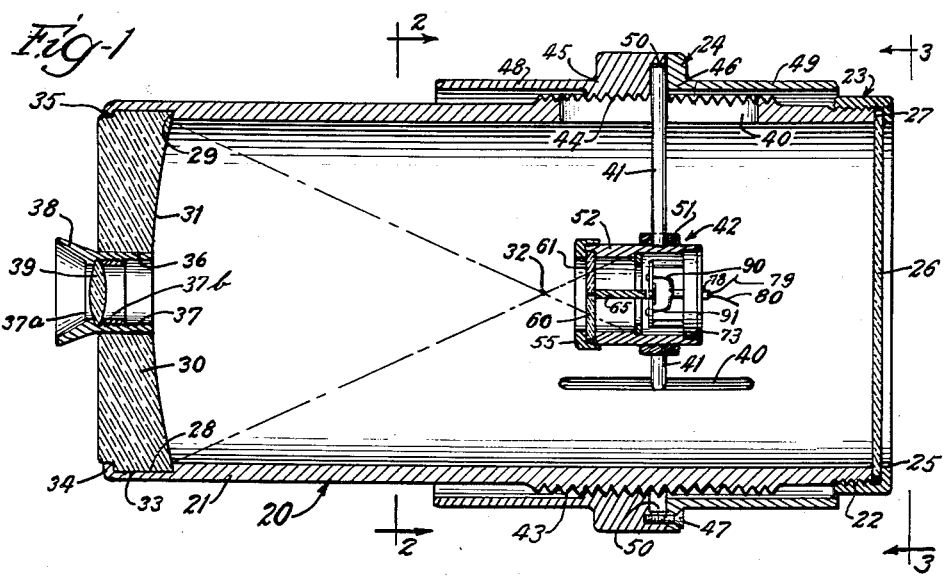
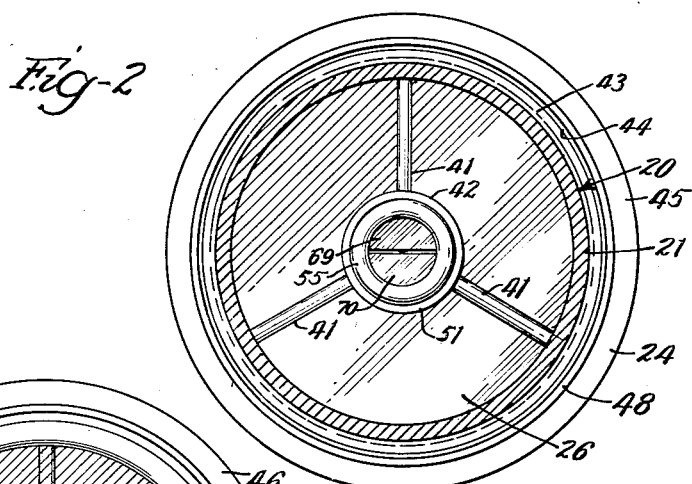
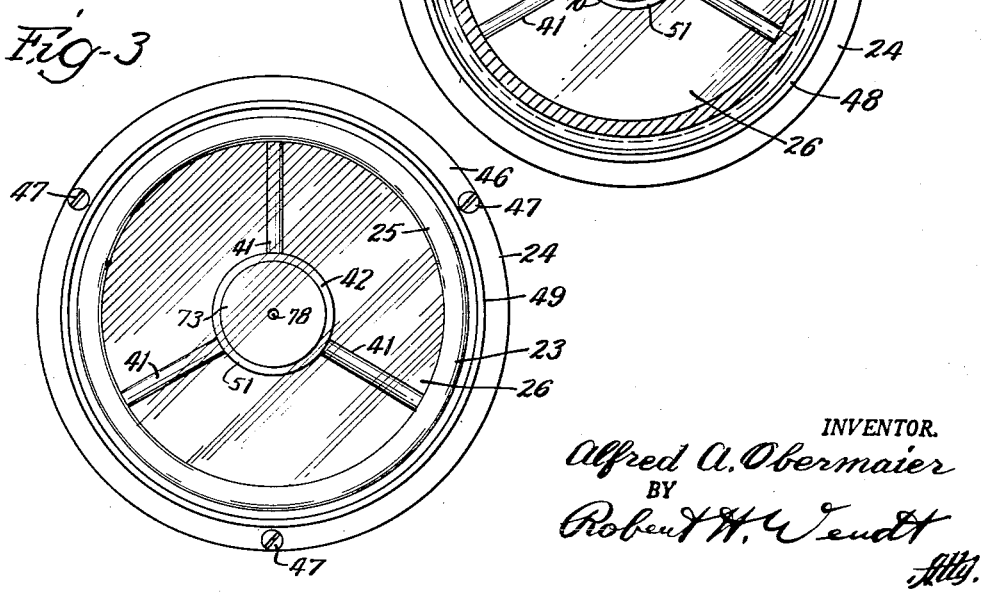
INVENTOR.
Alfred A. Obermaier
BY
Robert H. Wendt
Atty.

July 23, 1957 A. A. OBERMAIER 2,800,023
RADIATION PYROMETERS
Filed March 24, 1954 2 Sheets-Sheet 2
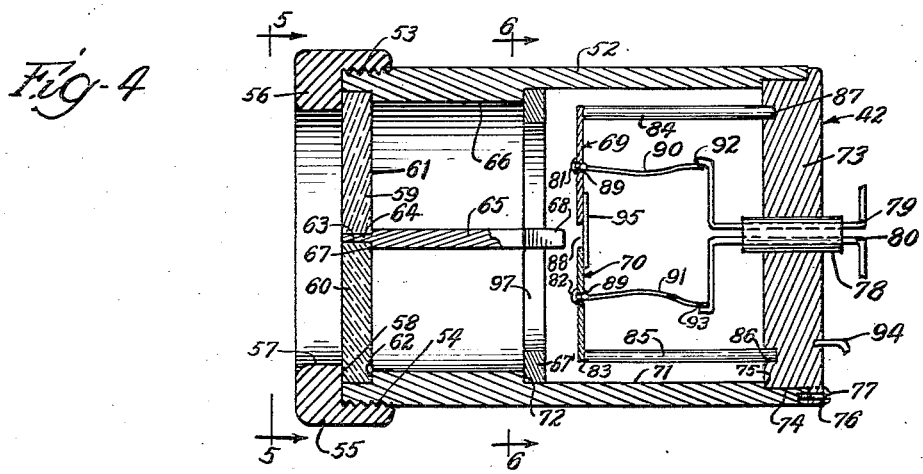
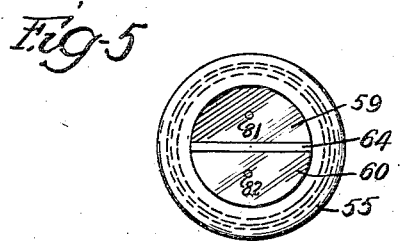
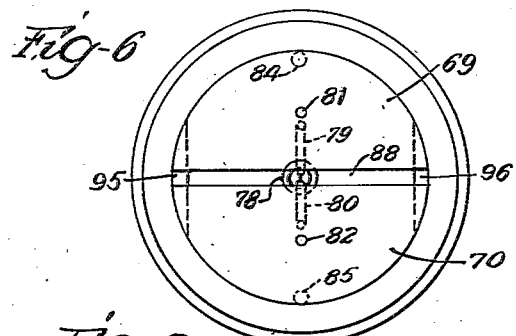
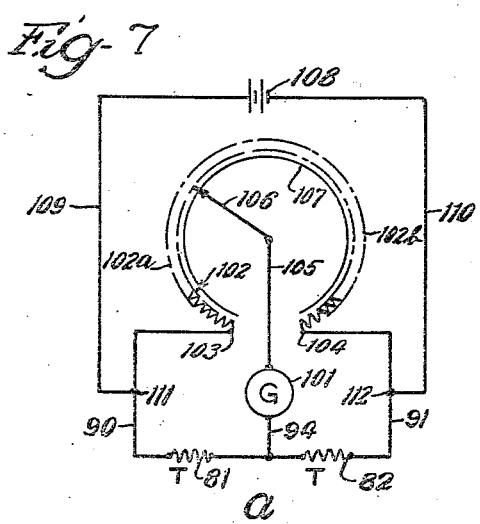
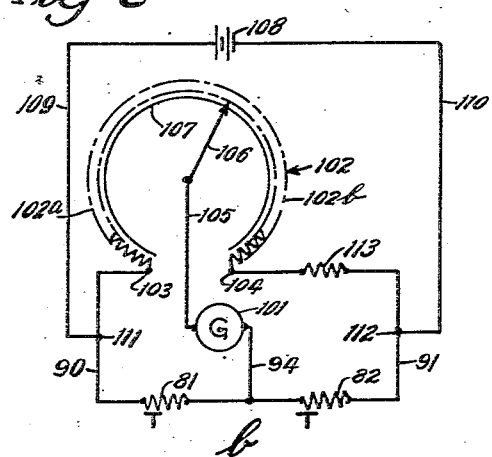
INVENTOR.
Alfred A. Obermaier
BY Robert H. Wendt
Atty.

United States Patent Office 2,800,023
Patented July 23, 1957

2,800,023

RADIATION PYROMETERS

Alfred A. Obermaier, Park Ridge, Ill., assignor to Illinois Testing Laboratories, Inc., Chicago, Ill., a corporation of Illinois Application March 24, 1954, Serial No. 418,309

4 Claims. (Cl. 73—355)

The present invention relates to radiation pyrometers, and is particularly concerned with the provision of an improved radiation pyrometer for measuring temperatures of a radiating source by means of two simultaneous measurements of radiation of different wave bands from the same radiating source.

The measurements are made and indicated as a ratio of energy received by a temperature receiver receiving radiant energy from a radiating source through a filter passing wave lengths from 0 to $\lambda_1$ to the energy received by a second temperature receiver receiving radiant energy from the same radiating source through a filter passing wave lengths from 0 to $\lambda_2$, where $\lambda_2$ is greater than $\lambda_1$.

A total radiation pyrometer works on the basis of a single measurement of the radiation of all wave lengths from 0 to $\lambda$ from a radiating source, where the optical characteristics and the receiver surface determine the long wave cut-off.

In such case the temperature calibration is based on the Stefan-Boltzman law of total radiation $$I = a(T_s^4 - T_r^4)$$

where I is the intensity of radiation on the receiver, $a$ is a constant, grouping several constants in one figure, depending on the radiating conditions of the source, $T_s$ is the temperature of the radiating source, and $T_r$ is the temperature receiver.

In such a case the calibration of the instrument holds true only if the radiating source is a black body; that is to say, its emissivity is equal to unity. If the emissivity is substantially less than unity, the errors of measurement may become quite large, due to the fact that the instrument was calibrated with a black body. This is especially true of radiating bodies that have no visible radiation.

By employing a system which measures a ratio of two bands of energy received from the same radiating source it can be shown that the emissivity factor of the measurement cancels out and the temperature of the source may be measured directly in terms of the ratio.

The energy emitted according to Planck's radiation law in wave length band 0 to $\lambda$ is:

$$E = \frac{C_1}{C_2} e^{\frac{C_2}{\lambda T}\left(\frac{1}{\lambda_3} \cdots\right)}$$

$$C_1 = 8\pi hc \quad C_2 = \frac{hc}{K}$$

Providing $$e^{\frac{C_2}{\lambda}} \gg 1$$

For practical purposes, we have omitted the last two terms of this equation, which are not needed for accuracy of measurement, providing certain conditions are present.

where $\lambda$ = wave length in cm.

$c$ = velocity of light in cm.
$h$ = Planck's constant
$k$ = Boltzman's constant
$T$ = temperature in °K. of radiating body where $E_1$ = energy from 0 to $\lambda_1$
$E_2$ = energy from 0 to $\lambda_2$ Taking the ratio:

$$\frac{E_2}{E_1} = \frac{\lambda_1^3}{\lambda_2^3} e^{C_2/T\left(\frac{1}{\lambda_1} - \frac{1}{\lambda_2}\right)}$$

Solving for T:

$$T = \frac{C_4}{\ln\frac{E_2}{E_1} - C_3}$$

Analyzing this relation, we see that the ratio $$\frac{E_2}{E_1}$$

must be greater than 1 for validity, so that the temperature range of the instrument is made by the proper choice of filters $\lambda_1$ and $\lambda_2$.

One of the objects of the invention is the provision of means for measuring temperature of a radiating source by measuring the ratio of radiation in two wave bands from said source, by comparing the E. M. F.'s generated or the temperature variation in resistance of two similar and comparable temperature sensing members.

Another object of the invention is the provision of measurement of the temperature of a radiating source by means of two separate measurements made simultaneously on radiation from the same source through two different wave length cut-off filters and to measure these values as a ratio, for the purpose of eliminating such factors as emissivity and changes in receiver temperature, which are due to ambient temperature changes.

Another object of the invention is the provision of a direct reading radiation pyrometer, which is accurate, sensitive, sturdy, simple, which can be calibrated directly in temperature, which maintains its calibration, and which may be manufactured at a low cost.

Another object of the invention is the provision of an improved low temperature radiation pyrometer in which the receivers are used as a radiating source by increasing their temperature, so that the receivers then radiate energy to the object to be measured, increasing the sensitivity by increasing the exchange of energy between the receiver and the subject.

Another object of the invention is the measurement of the energy radiated from the subject in two overlapping wave bands, by means of two similar temperature sensitive elements, the changes in condition of which are directly compared as a ratio which is an indication of the temperature of the subject.

Another object of the invention is the provision of an improved radiation pyrometer based upon the fact that temperature is a function of the ratio of the energy radiated over two different ranges of wave length and to simplify the measurement of the temperature by making the ratio measurement of the radiation over the two different ranges of wave length simultaneously, and directly indicating the temperature upon the scale of an instrument.

Another object of the invention is the provision of means for measuring the temperature of an object which is heated or otherwise conditioned to emit radiation, which is independent of surface conditions of the object, such as emissivity, and also means for making a measurement of the temperature of the object, which is independent of the receiver temperature.

Other objects and advantages of the invention will be apparent from the following description and the accompanying drawings, in which similar characters of reference indicate similar parts throughout the several views.

Referring to the four sheets of drawings accompanying this specification,

Fig. 1 is an axial sectional view taken on a plane passing through the axis of a radiation pyrometer structure which is used as the receiver for receiving radiation over two different wave bands from a radiating source, the temperature of which is to be measured;

Fig. 2 is a sectional view taken on the plane of the line 2—2 of Fig. 1, looking in the direction of the arrows;

Fig. 3 is an end elevational view taken on the plane of the line 3—3 of Fig. 1, looking in the direction of the arrows;

Fig. 4 is an axial sectional view taken on the plane of the axis of a receiver structure for the pyrometer;

Fig. 5 is a fragmentary end elevational view taken on the plane of the line 5—5 of Fig. 4 and is an enlarged view of the receiver as seen through the magnifying eye piece;

Fig. 6 is a sectional view taken on the plane of the line 6—6 of Fig. 4;

Fig. 7 is a wiring diagram showing the circuit arrangement when two thermistor elements or negative temperature coefficient semi-conductors are used for the temperature sensing devices;

Fig. 8 is a modified circuit showing the use of an additional multiplying resistance.

Referring to Fig. 1, 20 indicates in its entirety one form of instrument embodying the invention, which may include a cylindrical housing 21 provided at its receiving end with external threads 22 for receiving a threaded ferrule 23.

The housing 21 may be made of any suitable metal, such as brass; and the same is true of the adjustable sleeve 24 and ferrule 23. Ferrule 23 has an inwardly extending radial flange 25 adapted to engage the edge of a circular window 26, which is clamped against the end 27 of the housing by the flange 25.

Window 26 may be made of any suitable transparent material adapted to pass the longest wave length which is to be the subject of radiation to the instrument. At its opposite end the cylindrical housing 21 is provided with an annular internal groove 28 bounded by an undercut shoulder 29 for receiving a complementary end wall member 30, which may be made of metal, plastic, glass, or any suitable opaque material, and which is provided with an inner spherical surface 31, having a surface mirror, the focus of which is at 32.

The end wall 30 fits in the groove 28, having an external complementary cylindrical surface 33, and may be retained in place by an inwardly spun flange 34 on the housing, engaging a rabbeted formation 35 on the end wall.

The end wall 30 has a centrally located cylindrical aperture 36, receiving a tubular eye piece member 37, which may be frictionally mounted in the end wall or cemented in place. The eye piece member 37 has a flaring frusto-conical outer portion 38 and is provided with an objective lens 39 for enlarging the image of the radiating object, which appears on the receiver.

The eye piece sleeve 37 may be made of metal cemented in the glass end wall 30, having an annular shoulder 37a engaging the lens 39, which is secured in the eye piece by threaded ring 37b.

The housing 21 is provided with a plurality of longitudinally extending slots 40, such as three slots arranged at equal angles. The slots 40 extend longitudinally and are for passing the supporting spider wires 41, which carry the receiver unit 42.

The housing 21 preferably has a threaded enlargement 43, extending over and beyond the length of the slots 40 for threaded engagement with the internal threads 44 carried by focusing sleeve 24. Focusing sleeve 24 may consist of two parts, the sleeve member 45 carrying the threads 44, and the extension 46, which may be secured to the sleeve 45 by threaded screw bolts 47.

The internal threads 44 in the sleeve 45 are carried by a portion of smaller internal diameter and are of limited length; and the focusing sleeve 24 is provided with the tubular extensions 48 and 49, of larger diameter, adapted to pass the threaded portions and the ferrule 23 and to cover up the slots 40.

The sleeve member 45 may have an annular groove 50 for receiving the spider wires 41, which are confined in the groove by means of the sleeve head 46 and screw bolts 47. The spider wires 41 extend radially from a circular collar 51, to which they are fixedly secured; and the collar 51 supports the receiver 42 by surrounding its cylindrical housing 52 and frictionally engaging it.

The ends of spider wires 41 engage the base of groove 50, which is cylindrical and which centers the receiver as the wires slide in groove 50. As the focusing sleeve progresses on housing 21 the wires slide longitudinally in slots 40, and peripherally in groove 50.

Referring to Fig. 4, the receiver 42 is there shown on a larger scale; and the housing 52 may consist of a cylindrical tube of brass, which is provided with external threads 53 at one end. The threads 53 engage the internal threads 54 of a ferrule 55, comprising a circular metal member having an inwardly extending radial flange 56 and a cylindrical bore 57.

The flange 56 has its inner surface 58 engaging the outer face of the two filters 59 and 60, the inner face 61 of which engages the annular shoulder 62 on the housing. The filters 59 and 60 are preferably of different materials, having different cut-off points for transmission of radiation of certain wave lengths. For example, one filter 59 may be made of a material sold on the market under the trade name "Kel-F," chemically known as trifluorochloraethylene polymers; and this filter will transmit wave lengths from 0 to 7.8 microns. The other filter 60 may be made of a suitable material, such as arsenic trisulphide glass, which transmits wave lengths of 0 to 13 microns.

I desire it to be understood that the two materials mentioned are by way of example; and many different types of materials may be employed for filters. The filters 59 and 60 are substantially half circular segments, and when placed together, form a circular assembly with a transverse partition slot 63, which is adapted to receive and clamp the reduced flat end 64 of a partition member 65, to which the filters are cemented.

The partition member 65 is wide enough to traverse the internal bore 66 of housing 52, the walls of which it engages at opposite diameters; and the partition 65 has shoulders 67 engaging the inner face of the filters.

The brass partition 65 extends longitudinally of the housing 52 through the cut-off ring 67' and has its end 68 adjacent the temperature sensing elements 69, 70. Partition 65 keeps separate the radiations of different wave lengths which are passed by the respective filters 59 and 60 and prevents these different radiations from engaging any radiation sensing element except the one for which they are intended on the same side of the partition.

The housing 52 may have an annular shoulder 72 against which the cut-off ring 67' is seated, frictionally engaging in the bore 71.

The right end wall 73 of housing 52 may comprise a circular metal disc, having a reduced portion 74 received in the tube 52 against a shoulder 75, and having an external radial flange 76 covering the end of the tube and secured by screw bolts 77 threaded into the wall.

The end wall 73 supports a two-hole ceramic bead 78, which is an electrical insulator, and which has two supporting conductors 79 and 80 passing through the holes and sealed therein for extending to the thermistors 81, 82, which are the temperature sensing elements in Fig. 4. The thermistor elements preferably comprise negative temperature coefficient electrical conductors; but in some embodiments may comprise positive temperature coefficient material.

The thermistors 81, 82 are mounted on half circular segments 69 and 70 of blackened copper, which may be 0.001 inch thick, and which may be soldered or otherwise electrically secured at 83 adjacent their peripheries to the metal rods 84, 85, which act as supports and grounding conductors and have their ends secured in bores 86 and 87 in the metal end wall 73.

Each half circular segment 69 and 70 of the temperature sensing elements has a through bore located at half radius from the periphery on a diameter which is transverse to the separation 88, comprising a slot between the elements 69 and 70.

The two copper segments 69 and 70 are separated by being cemented to mica separators 95, 96 located at each end of the open slot 88.

Each thermistor 81, 82 comprises a bead of the negative temperature coefficient material provided with two wires, one of which passes through the aperture in the segment 69 or 70 and is soldered on the rear face at 89 by a drop of solder. The other wire from thermistor 81 or 82 is indicated at 90 and 91 extending backward to the right and being electrically connected at 92 and 93 by soldering to the conductors 79 and 80.

The thermistors 81, 82 may comprise negative temperature semiconductors of magnesium or zinc oxide. The circuit through the thermistors 81, 82 is through the conductors 79 and 80 and conductors 90, 91 to the thermistors 81, 82, respectively, and through the copper segments 69 and 70 to the rods 84, 85, which are grounded on the end wall 73 and have a common conductor 94.

The cut-off ring 67 has an internal circular bore 97 smaller than the diameter of the copper segments 69 and 70 and is made of chromium plated brass for the purpose of blocking stray radiation, which is reflected back toward the filters and dissipated.

The operator adjusts the image, which he sees through the eye piece lens 39, by rotating the focusing sleeve 24, causing it to progress to the left or right on the housing 21 until the image is to be seen just inside the cut-off ring 67, which determines the field of radiation.

Referring to Fig. 7, this is a wiring diagram of a circuit for the instrument employing thermistors for making a ratio measurement by means of a null detector. The circuit includes a galvanometer 101 connected to the mid-point or ground conductor 94 between the two thermistors 81 and 82 connected to conductors 90 and 91.

Conductors 90 and 91 are connected to the ends of a slide wire potentiometer 102 at 103 and 104; and the other terminal of the galvanometer 101 is connected by conductor 105 to the rotating slide arm 106, engaging the potentiometer 102 and acting as the pointer of a ratio dial equipped with suitable indicia 107.

The D. C. source, such as a battery 108, has its terminals connected by conductors 109, 110 to the bridge circuit at 111 and 112 between the potentiometer and the thermistors.

The potentiometer 102 may be calibrated in terms of temperature along the resistance coils 102, which are arranged in a circle to cooperate with the pointer 106. The pointer 106 is moved until zero current is shown on the galvanometer like any bridge circuit; and the temperature is represented as a ratio of that portion 102a of the potentiometer on one side of the pointer 106 over that portion 102b on the other side of the pointer 106.

In other embodiments of the invention the galvanometer null detector may be replaced by another type of null detector in a servo system, including a servomotor, which drives the slide arm on the ratio dial until it reaches the position of null reading.

Referring to Fig. 8, this shows a similar circuit employing an additional resistance 113 in the potentiometer branch for extending the ratio range.

An example of the design of a low temperature radiation pyrometer is as follows:

Suppose one filter for $\lambda_1$ is a Kel-F filter, having cut-off at 7.8 microns. Suppose the other filter for $\lambda_2$ is a trisulphide glass filter, having a cut-off at 12 microns. Then R, the ratio of the two signals from the temperature source through the two filters, is described as follows:

$$R = \frac{\lambda_1^3}{\lambda_2^3} e^{C_2/T \left(\frac{1}{\lambda_1} - \frac{1}{\lambda_2}\right)}$$

where $$e^{\frac{C_2}{\lambda T}} \gg 1, \text{ and } R \gg 1$$

$$C_2 = \frac{hc}{K} = 1.42$$

$$R = \frac{(7.8 \times 10^{-4})^3}{(12 \times 10^{-4})^3} e^{\frac{1.42}{T} \left(\frac{1}{7.8 \times 10^{-4}} - \frac{1}{12 \times 10^{-4}}\right)}$$

$$R = .302 e^{\frac{1.42}{T} \times 448}$$

$$R = .302 e^{\frac{636}{T}}$$

$$e_m R = \frac{636}{T} + ln\, .302$$

| ° C. | T. deg. K. | R |
|---|---|---|
| 0 | 273 | 3.08 |
|   | 283 |   |
|   | 293 |   |
|   | 303 |   |
|   | 323 |   |
| 60 | 333 | 2.03 |
|   | 343 |   |
|   | 353 |   |
|   | 363 |   |
|   | 373 |   |
|   | 383 |   |
|   | 393 |   |
| 130 | 403 | 1.46 |
| 180 | 453 | 1.2 |

*Mode of operation*

The operation and mode of use of the present pyrometer is as follows:

The eye piece of the instrument of Fig. 1 is held to the eye, while the window at the opposite end is pointed at the radiating source. The instrument is focused until the radiating source substantially occupies all of the space, with its image inside the cut-off ring.

The radiation from the source then passes into the instrument; and wave lengths from 0 to $\lambda_1$, are absorbed by one receiver, while wave lengths from 0 to $\lambda_2$ are absorbed by the other receiver.

The resulting signals may be either changes in resistance drop in the circuit or changes in generated E. M. F. caused by the two temperature sensitive elements. By passing a large current from the battery through the receiver resistance elements, using the circuit of Fig. 9 thereby raising their temperature and causing the thermistors to operate on a steeper portion of their T-R curve where temperature changes cause greater changes in resistance. The amount of current passing through the thermistors 81, 82 depends on the ratio of the resistances of the two circuits which are receiving current from the battery 100 at 111, 112. By using a suitable battery and increasing the resistance 113 a large current can be passed through the thermistors 81, 82, heating them electrically.

The amount of heating of the receiver is not critical because once again we are measuring a ratio, which in this case is a ratio of the energy being taken away from the receiver through the filters $\lambda_1$ and $\lambda_2$. The radiation sensitive elements are preferably thin blackened copper diaphragms supporting thermistors, which in each case are in heat conducting relation with the diaphragms, which gather the heat from the radiation and conduct it to the thermistors.

The receiver supporting such radiation sensitive elements is preferably of very small mass in relation to its area, such as the half circular segments of very thin blackened copper, $\frac{1}{1000}$ of an inch thick.

By reducing the mass of the receiver, much less heat is required to raise its temperature and the temperature of the heat-sensitive element carried thereby.

It will thus be observed that I have invented an improved radiation pyrometer adapted to be used to measure the temperature of a radiating source by means of a simultaneous measurement of radiations in two different ranges of wave lengths. The temperature of the radiating source is a function of the ratio of the energies radiated in these two different ranges of wave lengths; and this ratio may be directly indicated on the instrument in terms of temperature.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. In a radiation pyrometer, the combination of a supporting housing of tubular material with a closure for one end of said housing, having a concave focusing surface mirror on the inside of said closure, said closure having a central aperture provided with an objective lens, a transparent window carried by the other end of said housing and adapted to pass the longest wave length, which is the subject of radiation, into said housing, a receiver unit centrally located in said housing and facing toward said surface mirror, said receiver unit comprising a cylindrical tube provided at the end toward said mirror with a pair of half circular filters, each filter being adapted to pass a certain different range of wave lengths of radiation, a pair of thermistors in said unit, each thermistor being mounted upon a blackened thin metal diaphragm of semi-circular shape, having a minimum mass of metal, and being in heat conductive relation with each thermistor, a partition opaque to the radiation extending backwardly in said unit from said filters, from the diametrical separation between the filters, and preventing the radiations of different wave lengths from engaging any thermistor except the one on the same side of the partition, an internally threaded collar carrying a plurality of radial supporting elements slidably mounted in an annular groove in said collar and carrying said unit centrally of said pyrometer housing, said collar being threaded on said tubular housing to be adjusted longitudinally thereof for focus, the said unit being adjusted by viewing through said objective lens the image of said source of radiation, to receive the total radiation from said source when the image coincides in size with the thermistor diaphragm, a null circuit including a potentiometer arranged in a circle with a contacting pointer connected to the galvanometer, which in turn is connected to a mid-point between said thermistors, a battery applying E. M. F. to said circuit at two points between the thermistors and the potentiometer, the said battery and resistance of the circuit being proportioned to apply a heating current to the thermistors, which are heated by the total radiation of the two bands of wave lengths, respectively, to effect a change in current which is balanced by the adjustment of said pointer on the potentiometer to a null point, the heating of the thermistors causing them to operate on steeper portions of their T-R curves where changes in temperature produce larger changes in electrical resistance.

2. In a radiation pyrometer, the combination of a support with a concave focusing mirror carried thereby, said mirror having a central aperture provided with an objective lens, a receiver unit carried by said support in the axis of said mirror and facing toward said mirror, said receiver unit comprising a pair of half circular filters, one of said filters passing all radiation wave lengths up to a predetermined maximum in the infra-red range, and the other of said filters passing all wave lengths up to another predetermined maximum of lesser length in the infra-red range, a pair of thermistors carried by said unit, each thermistor being mounted upon a blackened thin metal diaphragm of semicircular shape, which is in heat conductive relation with each thermistor, the diaphragms being mounted to form a circular assembly of the same size as the assembly of said filters, means for adjusting the position of said receiver unit for focus by viewing the image of a source of radiation until the image coincides in size with said diaphragm assembly, said source causing two beams of equal size to extend over separate paths to said diaphragms, an indicating circuit comprising a galvanometer connected to a movable pointer contact sliding on a calibrated potentiometer resistance, the ends of which are connected with said thermistors, said galvanometer being connected to the mid point between said thermistors and a source of E. M. F. connected to the junctures between each thermistor and potentiometer end, said source effecting heating of the thermistors and energizing the circuit to cause the thermistors to operate upon a steeper portion of their T-R curve, for increasing their change of resistance due to change of temperature caused by total radiation of both bands of wave lengths, the contact being adjusted until the galvanometer current indicates zero and the contact indicates the temperature of the source with its pointer.

3. In a radiation pyrometer, the combination of a support with a concave focusing mirror carried thereby, said mirror having a central aperture provided with an objective lens, a receiver unit carried by said support in the axis of said mirror and facing toward said mirror, said receiver unit comprising a pair of half circular filters, one of said filters passing all radiation wave lengths up to a predetermined maximum in the infra-red range, and the other of said filters passing all wave lengths up to another predetermined maximum of lesser length in the infra-red range, a pair of thermistors carried by said unit, each thermistor being mounted upon a blackened thin metal diaphragm of semicircular shape, which is in heat conductive relation with each thermistor, the diaphragms being mounted to form a circular assembly of the same size as the assembly of said filters, means for adjusting the position of said receiver unit for focus by viewing the image of a source of radiation until the image coincides in size with said diaphragm assembly, said source causing two beams of equal size to extend over separate paths to said diaphragms, an indicating circuit comprising a galvanometer connected to a movable pointer contact sliding on a calibrated potentiometer resistance, the ends of which are connected with said thermistors, said galvanometer being connected to the mid point between said thermistors and a source of E. M. F. connected to the junctures between each thermistor and potentiometer end, said source effecting heating of the thermistors and energizing the circuit to cause the thermistors to operate upon a steeper portion of their T-R curve, for increasing their change of resistance due to change of temperature caused by total radiation of both bands of wave lengths, the contact being adjusted until the galvanometer current indicates zero and the contact indicates the temperature of the source with its pointer, the said filters supporting an opaque partition extending toward the juncture of the thermistor diaphragms to separate the radiations passing the two filters.

4. In a radiation pyrometer, the combination of a support with a concave focusing mirror carried thereby, said mirror having a central aperture provided with an objective lens, a receiver unit carried by said support in the axis of said mirror and facing toward said mirror, said receiver unit comprising a pair of half circular filters, one of said filters passing all radiation wave lengths up to a predetermined maximum in the infra-red range, and the other of said filters passing all wave lengths up to another predetermined maximum of lesser length in the infra-red range, a pair of thermistors carried by said unit, each thermistor being mounted upon a blackened thin metal diaphragm of semicircular shape, which is in heat conductive relation with each thermistor, the diaphragms being mounted to form a circular assembly of the same size as the assembly of said filters, means for adjusting the position of said receiver unit for focus by viewing the image of a source of radiation until the image coincides in size with said diaphragm assembly, said source causing two beams of equal size to extend over separate paths to said diaphragms, an indicating circuit comprising a galvanometer connected to a movable pointer contact sliding on a calibrated potentiometer resistance, the ends of which are connected with said thermistors, said galvanometer being connected to the midpoint between said thermistors and a source of E. M. F. connected to the junctures between each thermistor and potentiometer end, said source effecting heating of the thermistors and energizing the circuit to cause the thermistors to operate upon a steeper portion of their T–R curve, for increasing their change of resistance due to change of temperature caused by total radiation of both bands of wave lengths, the contact being adjusted until the galvanometer current indicates zero and the contact indicates the temperature of the source with its pointer, the said filters supporting an opaque partition extending toward the juncture of the thermistor diaphragms to separate the radiations by passing the two filters, and a cut-off ring carried by said support at the end of said partition, and limiting the field of radiation to the area of the diaphragm assembly.

References Cited in the file of this patent

UNITED STATES PATENTS

| | | |
|---|---|---|
| 1,639,411 | Mechau | Aug. 16, 1927 |
| 1,716,775 | Hayes | June 11, 1929 |
| 1,901,192 | Reinhardt et al. | Mar. 14, 1933 |
| 2,302,554 | Kingsbury | Nov. 17, 1942 |
| 2,601,508 | Fastie | June 24, 1952 |
| 2,658,390 | Machler | Nov. 10, 1953 |
| 2,674,155 | Gibson | Apr. 6, 1954 |

FOREIGN PATENTS

| | | |
|---|---|---|
| 7,585 | France | Sept. 2, 1907 |
| 113,865 | Great Britain | Mar. 14, 1918 |
| 621,678 | Great Britain | Apr. 14, 1949 |
| 626,920 | Great Britain | July 22, 1949 |